United States Patent [19]
Zaffaroni

[11] 4,104,196
[45] Aug. 1, 1978

[54] NONABSORBABLE ANTIOXIDANT METHOD

[75] Inventor: Alejandro Zaffaroni, Atherton, Calif.

[73] Assignee: Dynapol, Palo Alto, Calif.

[21] Appl. No.: 666,845

[22] Filed: Mar. 15, 1976

Related U.S. Application Data

[62] Division of Ser. No. 367,971, Jun. 7, 1973, Pat. No. 3,994,828.

[51] Int. Cl.$^2$ ............................................. C09K 15/08
[52] U.S. Cl. ................................... 252/404; 252/401; 252/402; 252/403; 252/407; 252/460; 426/544; 426/545; 426/546
[58] Field of Search ............... 252/402, 404, 401, 182, 252/403, 407, 460; 426/544, 546, 545

[56] References Cited

U.S. PATENT DOCUMENTS

| | | | |
|---|---|---|---|
| 3,471,909 | 6/1973 | Yamane et al. | 252/401 |
| 3,887,477 | 6/1975 | Brachman et al. | 252/401 |

*Primary Examiner*—Stephen J. Lechert, Jr.
*Attorney, Agent, or Firm*—William H. Benz

[57] ABSTRACT

Novel, nonabsorbable antioxidants of the general formula $(An\mathord{\sim})_n R$ wherein An is a means for preventing oxidation of an oxidizable material, R is a means for essentially restricting the absorption of An in a biological environment, $\sim$ is a means for covalently bonding An to R for a prolonged time, and $n$ is at least one. The nonabsorbable antioxidants are useful as stabilizers in oxidizable materials without any substantial absorption of the antioxidant in the biological environment.

2 Claims, No Drawings

NONABSORBABLE ANTIOXIDANT METHOD

This is a division of application Ser. No. 367,971, filed June 7, 1973, now U.S. Pat. No. 3,994,828.

FIELD OF THE INVENTION

This invention pertains to both a novel and useful composition of matter. More particularly, the invention relates to comestible compositions comprised of a nonnutritive antioxidant suitably mixed with a comestible for preserving the nutritional value thereof. The comestibles containing the nonnutritive antioxidant can be used by animals including humans and avians without any appreciable biological absorption, metabolism or assimilation of the nonnutritive antioxidant. Specifically, the invention concerns comestibles comprised of a comestible and a nonnutritive antioxidant wherein the active antioxidant group is bonded through a covalent bond that substantially resists rupture in the environment of use to a biologically acceptable molecule whose molecular dimensions prevent its absorption. That is, on oral ingestion by a host the nonnutritive antioxidant which preserves and stabilizes the comestible is ingested without any appreciable metabolic digestion, absorption or assimilation so that the nonnutritive antioxidant is eliminated essentially intact from the host. The compositions include the nonnutritive antioxidants mixed with foods including beverages, confectionaries, medicinals and the like.

BACKGROUND OF THE INVENTION

The need and use of foods, including beverages, confectionaries, medicines and the like is one of the primary needs and basic cravings of both animals and humans. The universal use of naturally occurring and synthetic foods and the like to satisfy this natural need has not been met without its accompanying disadvantages. For example, many foods and the like are subjected to deterioration by naturally occurring and induced environmental conditions that either render them unfit for consumption or severely lessen the nutritional value of the food. It is known that the nutritional value of foods arises from its major ingredients consisting of carbohydrates, fats, proteins, vitamins and other useful nutrients and that deterioration and spoilage can occur either simultaneously for all the ingredients or for a single one. For example, the carbohydrate portion of many food products can lose its nutritive value by readily undergoing oxidation or other reactions as evidenced by discoloration or off-flavors. The discoloration often is due to autoxidation of valuable natural pigments such as carotenes and the like or to a chemical browning reaction that can occur between carbohydrates and essential amino acids present in foods.

Similarly, foodstuffs containing fats and oils often become unacceptable for use by undergoing oxidative deterioration which results in off-flavors and off-odors usually termed rancid. This deterioration is generally due to their tendency to absorb or react with oxygen, and the observed rancidity results primarily from the products formed during oxidation. These products generally include unwanted peroxides, aldehydes, ketones and acids that impart an undesirable odor, taste and color to the foodstuff thereby making their use unacceptable. Proteins too are broken down by adverse conditions as they take up oxygen that constantly converts the protein to a different form as for example in the discoloration in meats such as in cured bacon and sausage. Also, certain therapeutic preparations such as those containing vitamin A have been subjected to considerable loss because the vitamin is unstable in the presence of atmosphere that readily oxidizes the vitamin to the corresponding useless product. Livestock and poultry feeds fortified with said vitamins for many years have been subjected to considerable loss of nutritive value due to these oxidizing influences.

In view of the above presentation many attempts have been made by the art to stabilize food substances and the like. These attempts usually involved adding known antioxidants to the substance or synthesizing new compounds with the hope that they would overcome the prior art problems. These antioxidants, whether known to the prior art or newly synthesized, usually functioned by a common mechanism such as hydrogen donation by the antioxidant, electron donation or addition by the antioxidant, forming a complex between the food substance and the antioxidant, by adding a chemical group to the food substance and the like. While these prior art antioxidants of diverse chemical structures such as phenolics, amines, carbonyl-amine reaction products, heterocyclics and the like in many instances stabilized the food, their mere addition presented certain disadvantages to the user. For example, on ingestion the antioxidants have no food value, they can break down to undefined moieties and they often are of questionable safety. These latter conditions are especially troublesome if the antioxidant is absorbed from the gastrointestinal tract or used in appreciable quantities. To overcome these unwanted disadvantages considerable research effort and expenditures have been made to develop alternative compounds that could fulfill the requirements of an antioxidant without possessing their inherent disadvantages. However, these alternatives, while often stabilizing the food, also are absorbed from the gastrointestinal tract and present like problems to the user. In view of the disadvantages associated with the prior art forms of antioxidants it becomes apparent that an immediate and pressing need exists for both new and useful antioxidants that are essentially free from the unwanted effects associated with the prior art type of antioxidants and simultaneously satisfy the inherent needs of both animals and humans.

OBJECTS OF THE INVENTION

Accordingly, it is an immediate object of this invention to provide a novel product useful as an antioxidant which product overcomes the aforesaid disadvantages associated with the prior art.

Still another object of the invention is to provide novel compositions of matter useful as an antioxidant for man and animals that can be used without any appreciable absorption, metabolism, or assimilation of the composition. Yet still another object of the invention is to provide a nonnutritive, noncaloric acceptable antioxidant useful for stabilizing assorted foodstuffs.

Still yet a further object of the invention is to provide a nonnutritive antioxidant that can be orally ingested, withstand substantial metabolic digestion and be eliminated by the host.

Still a further object of the invention is to provide a novel nonnutritive, nonassimilable antioxidant that can be used in confectionaries, beverages and medicines.

Yet a further object of the invention is to provide compositions of antioxidants that can be repeatedly and continuously used in various amounts without substantial unwanted effects on the user.

Still a further object of the invention is to provide nonabsorbable antioxidants that are easy and inexpensive to manufacture, have acceptable shelf life and carry through properties.

Another object of the invention is to provide comestibles containing a nonabsorbable antioxidant that substantially retards or inhibits oxidative deterioration in foods and pharmaceuticals.

Yet still another object of the invention is to provide a comestible composition containing a nonabsorbable antioxidant that retards or inhibits the development of rancidity and the associated oxidative changes which occur in food products and medicinals, and also retards the enzymatic decomposition of foods and the like.

Other objects, features and advantages of the invention will be apparent to those skilled in the art from the detailed description of this specification and the accompanying claims.

SUMMARY OF THE INVENTION

This invention concerns a comestible comprising a food, beverage, medicine or the like having intimately mixed therewith an active antioxidant to preserve and stabilize the food and the like wherein the antioxidant is comprised of the active antioxidant covalently bonded to a controlling molecule that resists active and passive transport in vivo. The covalent bond, or a functional equivalent thereof, is a bond that is able to withstand cleavage or rupture and that covalently bonds the active antioxidant group to the controlling molecule. That is, the bond resists cleavage or rupture in the preparation of an orally acceptable substance and it can also resist metabolic rupture in a biological environment of use. The controlling molecule is a chemical group whose molecular dimensions substantially prevent the absorption of the nonnutritive antioxidant comprised of the active group after ingestion by animals, humans or avians. The nonabsorbable, nonnutritive antioxidants can have varying degrees of solubility in various media and they are not absorbed in vivo. This latter feature advantageously eliminates the possibilities of side effects, caloric imput and the like.

DETAILED DESCRIPTION OF THE INVENTION

In accomplishing the objects, features and advantages of this invention, the invention in its broadest aspect relates to novel comestibles containing an antioxidant of the following general formula $(An)_n \sim R$ wherein An is an active antioxidant group, $\sim$ is a covalent bond, R is a polymeric molecule and n is at least one.

The representation "An" and the expression antioxidant group as used herein generally includes any chemical group that is capable of producing an antioxidant effect and can be covalently bonded to a restricting group R, while simultaneously retaining its ability to produce an antioxidant effect. The antioxidant group can be bonded directly or through other functionally equivalent covalent bonding moieties attached to the antioxidant group that are nonessential for an antioxidant effect. The antioxidant group can be of naturally occurring or synthetic origin and it can have a nutritive or nonnutritive value, which latter properties are not available because the antioxidant group is covalently bonded to the restricting or controlling molecule. Generally, the antioxidant group can be any group that produces an antioxidant result in an in vitro and in vivo environment.

The antioxidant group can be a compound comprised of the phenolic moiety as present in aliphatics, aromatics, heterocyclics and the like. The phenolic antioxidant can have one or more than one phenol moiety and it can be optionally substituted with other chemical entities. Typical phenols suitable for the purpose of the present invention include compounds represented by the structure

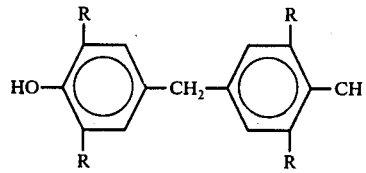

wherein R is a lower alkyl radical of 1 to 8 carbon atoms, or a lower alkoxy radical of 1 to 8 carbon atoms. The alkyl and alkoxy group can be branched or straight chain such as methyl, ethyl, propyl, isopropyl, hexyl, ethoxy, propoxy, t-butyoxy and the like. Exemplary compounds include bis(3,5-diisopropyl-4-hydroxyphenyl)methane; bis(3,5-di-sec-butyl-4-hydroxyphenyl)methane; bis(3-sec-phtyl-5-sec-amyl-4-hydroxyphenyl)methane; bis(3,5di-sec-heptyl-4-hydroxyphenyl)methane; bis(3,5-di-tert-butyl-4-hydroxyphenyl)methane; bis(3,5-di-tert-hexyl-4-hydroxyphenyl)methane; and the like. The phenolic antioxidants also include compounds of the formula

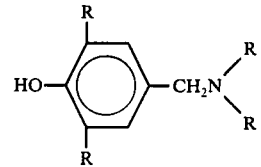

wherein the R's are the same or different and they are lower alkyls of 1 to 7 carbon atoms or a cycloalkyl of 4 to 6 carbons. Typical compounds include N-cyclohexyl-N-(3-methyl-5-isopropyl-4-hydroxybenzyl)amine; N-methyl-N-(3,5-diisopropyl-4-hydroxybenzyl)amine; N-octyl-N-(3-methyl-5-tert-butyl-4-hydroxybenzyl)amine; N,N-di-butyl-N-(3,5-diisopropyl-4-hydroxybenzyl)amine; N-isopropyl-N-(3,5-di-tert-amyl-4-hydroxybenzyl amine) and the like. A presently preferred group of antioxidants include the 2,4,6-trialkylphenols

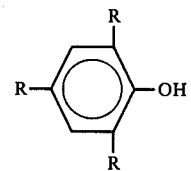

wherein R is the same or different and is a lower alkyl or alkoxy of 1 to 7 carbon atoms. Typical antioxidants include 2,6-di-tert-butyl-4-methyl phenol; 2,6-di-isopropyl-4-methylphenol; 2,6-di-tertiary-amyl-4-methylphenol; 2,6-di-tertiary-hexyl-4-methylphenol; 2,6-di-tertiary-heptyl-4-methylphenol; 2,4-dimethyl-6-tertiary-butylphenol; 2-tertiarybutyl-4-methoxyphenol, and the like. Also, antioxidants of the formula

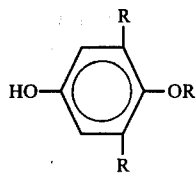

wherein R is hydrogen, or a lower alkyl. Typical phenolics include 2,5-ditertiary alkyl-4-alkoxyphenol such as 2,5-di-tertiary butyl-4-methoxyphenol and the like. The antioxidants also include

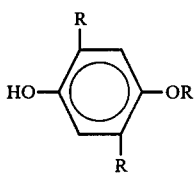

wherein R is lower alkyl, including 2-alkyl-4-alkoxyphenol; 2-tertiary-alkyl-4-alkoxyphenol; 2-tertiary-butyl-4-methoxyphenol; 2-tertiarybutyl-4-propoxyphenol; and the like. Coumarin antioxidants of the general formula

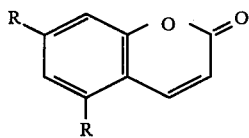

wherein at least one R is OH and the remaining R is hydrogen, hydroxyl and lower alkyl. Representative compounds include 7-hydroxy coumarin, 5-hydroxy coumarin, 5-methyl-7-hydroxy coumarin and the like. Other preferred phenolic antioxidants include nordihydroguaiaretic acid, tocopherols, gallic acid and its esters of the formula

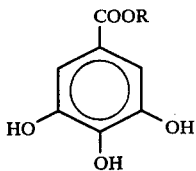

where R is lower alkyl; the parabens of the formula

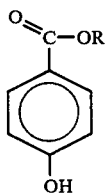

wherein R is a hydrogen or lower alkyl such as methy-4-hydroxybenzoate; isopropyl-4-hydroxy benzoate and the like; phenolic trihydroxyphenones of the formula

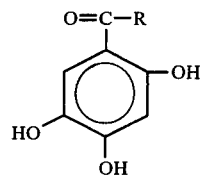

wherein R is a lower alkyl as represented by n-butyl 2,4,5-trihydroxyphenyl ketone; and other phenolic compounds. These and other phenolic antioxidants are known in U.S. Pat. Nos. 3,041,183; 3,208,859; 2,715,073; 2,738,281; 2,981,628; 2,758,931, and the like.

Other presently preferred antioxidants that can be used for An include the enediols particularly the 2,3-enediols of 3-ketoglycosides such as the 2,3-enediols of 3-ketomaltose, 3-ketosucrose, 3-ketolactose, 3-ketomaltobionic, 3-ketolactose, 3-ketomaltobionic acid and the esters thereof. These antioxidants are prepared according to procedures described in *J. Gen. Microbiol.* Vol 22, pages 129 to 136, 1960; *J. Micro. and Serology*, Vol. 27, pages 247 to 256, 1961 and U.S. Pat. No. 3,372,036. Other antioxidants within this group include ascorbic acid and the like.

Antioxidants suitable for the present purpose also include thioethers of the formula $R-S(CH_2)_nNH_2$ wherein R is a hydrogen atom, or a lower alkyl and $n$ is 1 to 5. Typical compounds include 3-methylthiopropylamine; 3-propylthiopropylamine; 3-n-butylthiopropylamine; and like compounds as disclosed in U.S. Pat. No. 3,579,357. Also, the thioethers of the formula $HOOC(CH_2)_nCH_2S-R_1$ wherein $R_1$ is hydrogen or lower alkyl, a lower alkyl substituted with a hydroxyl group, a sulfur hydrocarbon group wherein the hydrocarbon is a lower alkyl, or a sulfur-nitrogen-hydrocarbon group. Representative compounds include 3-methylmercaptopropionic acid; 3-hydroxymethylmercaptoproponic acid; 3-mercaptoethylmercaptopropionic acid; carboxyetherethylmercaptopropionic acid, 3-benzothiazylmercaptopropionic acid; and the like. These compounds are described in U.S. Pat. No. 2,564,106.

Other antioxidants suitable for the mode and manner of the instant invention include aromatic and aliphatic antioxidants substituted with a nitro, nitroso, azo or hydroxylamino group, such as aroxyl amine $NH_2OAr$ wherein Ar is a phenyl or benzyl group, alkoxyl amine $NH_2HOAk$ wherein Ak is a lower alkyl, and the like as set forth in U.S. Pat. No. 3,259,511. Also, the heterocyclic antioxidants such as 5-ethoxy-2,2,4-trimethyl-1,2-dihydroquinoline, 6-ethoxy-2,2,4-trimethyl-1,2-dihydroquinoline, Z-alkylene-

pyroles wherein Z is R—NH—, RRN—, or

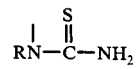

and R is a lower alkyl, as described in U.S. Pat. Nos. 3,155,521; 3,644,215; and 3,702,331. Still other antioxidants acceptable for the present purpose include aryl amines of the formula

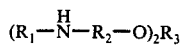

wherein $R_1$ is a phenyl radical, $R_2$ is a phenylene and $R_3$ is an alkylene or phenylene. Typical members of this class include 1,2-bis-p-anilinophenoxyethane; 1,1-bis-p-(p-tolylamino)phenoxyethane; bis-β-(p-xylylaminophenoxy)-diethylether and the like. Antioxidants for the formula

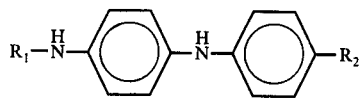

wherein $R_1$ and $R_2$ are lower alkyl and a typical member is N-isopropyl-N'-(p'-methylphenyl)-p-phenylenediamine; N-isopropyl-N'-(p-isopropylphenyl)-p-phenylenediamine and the like. Typical members of this class are disclosed in U.S. Pat. Nos. 2,103,188; and in 3,000,852.

Other miscellaneous antioxidants that can be used according to the spirit of the invention include the alkyl aryl phosphites, dithiocarbamates, thiazyl antioxidants, thiuramdisulfides, thiodipropionates, benzophenones and the like. Typical antioxidants include aldol-α-naphthylamine, 2,5-di-tert-amylhydroquinone, diphenylamine-acetone reaction product, poly(butylated)mixture-4,4'-isopropylidenediphenol, tri(mixed mono- and dinonylphenyl)phosphite and the like. *Encyclopedia of Polymer Science and Technology*, Vol. 2, pages 171 to 197, 1965; and, Kirk-Othmer *Encyclopedia of Chemical Technology*, Vol. 2, pages 588 to 604, 1965.

The graphic expression ∼ as used for the purpose of the invention broadly includes a covalent bond or a covalent bonding group that effectively joins the reactive antioxidant An group to a R moiety to form the novel, non-nutritive antioxidant compound $(An)_n R$ wherein $n$ is at least one, and usually from 1 to 10,000 or higher. Generally, the covalent bond or its functional equivalent as used herein includes any bond that can couple the biologically active antioxidant An to R. Generally, for an An group there is at least one covalent bond; and, the invention also includes embodiments comprised of an active An group covalently bonded through more than one position on the group to at least one position on R. The covalent bond is a bond or the equivalent thereof that substantially resists rupture, when admixed into assorted items of commerce, can resist thermal rupture at in vivo, baking and culinary temperatures, and can essentially resist acidic or basic hydrolysis and enzymatic cleavage during passage of the compound through the gastrointestinal tract of animals including humans, and also avians. That is, the non-nutritive antioxidants of the invention are able to maintain their physico-chemical integrity for a prolonged period of time. By prolonged period of time is meant the time in storage and manufacturing process times needed in preparing various commodities and the time required to pass through the gastrointestinal tract of the user. Typically, such periods of time may vary from 1 hour to 3 years or longer. The antioxidant group An is joined by the covalent bond or its equivalent to at least one position on R through at least one position or substituent on the antioxidant group that substantially does not interfere with its antioxidant properties. The R group of the antioxidant compound $(An)_n R$, as will be fully discussed later in this disclosure, is a restricting or controlling group that has a molecular shape or molecular weight and shape that substantially prevents in vivo absorption of itself and the An group as covalently bonded thereto. Thus, the antioxidant $(An)_n R$ of this invention and its products from functioning as an antioxidant are essentially nonabsorbed, and essentially nonassimilated in its passage through the gastrointestinal tract of the user.

Generically, the bonding expression ∼ includes a member selected from the group consisting of a single covalent bond, a straight chain divalent alkylene bridge $+CH_2)_n$ wherein $n$ is 1 to 18, a branched or a substituted divalent alkylene bridge of the formula $+CR_1R_2)_y$ wherein $R_1$ and $R_2$ are the same or different and they are selected from the group consisting of hydrogen, lower alkyl, lower alkoxy, lower alkenyl, hydroxyl, acyl and halogen with the proviso that at least one of $R_1$ and $R_2$ or both are other than hydrogen and are the same or different, and $y$ is 1 to 12 and the same or different, a lower alkenyl bridge —CH=CH—, a lower alkyne —C≡C—, an oxa linkage —O—, a carbonyldioxy

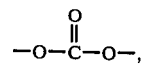

an acyl linkage

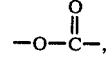

an amide function

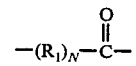

wherein $R_1$ is the same as $R_1$ and $R_2$ above, an azo linkage —N=N—, an alkylenedioxy of the formula —O$+CR_1R_2)_y$O— wherein $y$ is as defined, and $R_1 = R_2$ = hydrogen or any of the above as defined for $R_1$ and $R_2$; an alkenyldioxy bridge —O$+CH=CH)_z$O—; an alkyleneoxa linkage —O$+CR_1R_2)_y$O— wherein $z$ is 1 to 4, a straight chain azalkylene

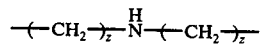

as well as $+CH_2)_z$N=CH$+CH_2)_z$; a thialkylene $+CH_2)_z$S$+CH_2)_z$ and oxidized forms thereof such as sulfoxide and sulfone, an oxalkylene $+CH_2)_z$O$+CH_2)_z$, a bivalent aromatic radical such as arylene

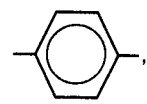

a bivalent aralkylene

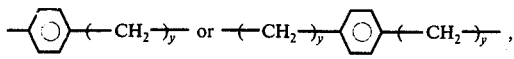

a divalent cocloalkylene

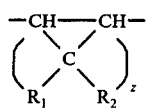

$R_1$ and $R_2$ are the same or different and are selected from hydrogen and as above defined and $z$ is 1 to 4, an alkylene oxide

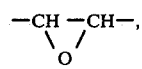

a divalent five or six-membered heterocyclic radical wherein the radical is a thiacyclic, an oxacyclic or a monazacyclic, a diazacyclic or a triazacyclic radical that can be optionally substituted or unsubstituted, and the like covalent bonding functions. Additionally, the invention embraces combinations and mixtures of the above bonding expressions.

Typical of the straight chain divalent alkylene $(CH_2)_n$ radical wherein $n$ is 1 to 18 suitable for the purpose of the invention as embraced in the above general formula includes methylene, ethylene, propylene, butylene, hexamethylene, octamethylene, nonomethylene, decamethylene, undecamethylene, dodecamethylene, tetradecamethylene, hexadecamethylene, heptadecamethylene, and octadecamethylene. Representative of lower alkyl groups substituted onto an alkylene bond include lower alkyl groups of 1 to 7 carbons include the straight and branched chain alkyl groups such as methyl, ethyl, n-propyl, n-butyl, n-amyl, isopropyl, isobutyl, t-butyl, sec-butyl, isoamyl, t-amyl, isohexyl, and the like. Exemplary lower alkenyl of 1 to 7 carbon atoms include ethenyl, 1-propenyl, allyl, 1-butenyl, 3-butenyl and the corresponding isomers thereof, such as 1-isobutenyl, 1-sec-butenyl, 1-pentenyl, 2-methyl-1-butenyl, 1,1-dimethyl-2-propenyl and the like. Representative lower alkoxy groups include lower alkoxy groups of 1 to 7 carbon atoms including methoxy, ethoxy, isopropoxy, butoxy, and the like.

Typical divalent bonding alkylene groups $(CR_1R_2)_y$ substituted with the above substituents include 1,1-dimethylmethylene, 1,1-dimethylethylene, 2-methylpropylene, 1-methoxymethylene, 2-ethoxypropylene, 3-methoxyhexamethylene, 4-isopropyloctylene, 2-allylpropylene, 2-butenyl-1-butylene and the like. Representative of alkenyl divalent groups include those having 2 to 7 carbon atoms such as 1-propenylene, 2-butenylene, 2-pentenylene, 2-propenylene, 2-methyl-2-butenylene, ethylene, 1-heptenylene and the like. Representative of lower alkyne divalent bonding groups of 2 to 7 carbon atoms include ethynylene, 2-propynylene, 2-penten-4-ynylene, 2-butynylene, 2-pentenediylidyne and the like.

The term alkylenedioxy as a divalent linkage as used herein includes the groups methylenedioxy, ethylenedioxy, propylenedioxy, butylenedioxy, hexylenedioxy and the like. The term alkenyldioxy includes ethenylenedioxy, 1-propenylenedioxy, 2-propenylenedioxy, isopropenylenedioxy, 1-butenylenedioxy and the like. Representative of azalkylene, thiaalkylene and oxalkylene include symmetrical or (syn) and unsymmetrical or (unsyn) azalkylenes, thiaalkylenes and oxalkylenes such as syn-azadimethylene, syn-azadiethylene, syn-azadipropylene, syn-thiadiethylene, syn-thiadipropylene, syn oxadimethylene, unsyn-oxamethylethylene and the like. Typical examples of arylene and aralkylene include phenylene, syn-phenyldimethylene, syn-phenyldiethylene, syn-phenylisopropylene and the like.

The term divalent cycloalkylene as used herein includes lower cycloalkyl radicals having 3 to 7 ring carbon atoms as illustrated by disubstituted cyclopropylene, cyclobutylene, cyclopentylene, cyclohexylene, cycloheptylene and the like. Representative of alkylene oxides are ethylene oxide and propylene oxide.

The expression "a divalent five or six membered heterocyclic radical having an oxa, aza or thia member" includes heterocyclic radicals having two positions suitable for forming covalent bonds, wherein one position covalently bonds with the An moiety and the other covalently bonds to the R moiety. Exemplary of hetero radicals are 2,5-thiazolyl, 3,4-furyl, 1,4-pyrazinyl, 3,4-pyrrolyl, 3,5-pyranyl, 3,5-piperidyl, 3,4-pyrazolidnyl, and the like. These and other covalent bonding groups that essentially maintain their original bonding integrity in vitro or in vivo atmosphere can be used for the purpose of the invention. The covalent bonding group also includes those groups that maintain their bondality, even with various substituents attached to the parent group. This includes substituents that may be altered, changed or reacted with other groups in the environment or use so long as the covalent bond between An and R maintains its physical and chemical integrity for a prolonged period of time.

The group R as used for the purpose of the present invention comprises a moiety that has An covalently bonded thereto. In operation, R serves to both confine An in a commodity and to transport it through the gastrointestinal tract of animals, humans or avians without any substantial absorption of R or of An. The group R can be classified as a restricting or controlling group or a restrictor or controller molecule because its dimensions, in size or shape or both, restrict the movement of $(An)_n R$ across the wall of the digestive tract. That is, R's chemical structure and dimensions essentially prevent active or passive absorption of An through the gastrointestinal wall into the systemic circulation so that An is always external to the body even when $(An)_n R$ is present in the gastrointestinal tract.

Group R can be naturally occurring or synthetic and it is preferably a material that maintains its physical and chemical integrity in the environment of use. That is, it is essentially nonmetabolizable, nonbiodegradable, indigestible and the like in the gastrointestinal tract. Group R can have either hydrophilic or hydrophobic properties. The nonnutritive antioxidant $(An)_n R$ including R can also be substituted with conventional groups that impart to the nonnutritive antioxidant degrees of aqueous or lipid solubilities to accommodate the presence in an assortment of edible commodities and in the environment of use. Generally, R includes any chemical moiety that can withstand digestion or prevent absorption of the antioxidant group and the entire nonnutritive antioxidant by biological absorption mechamisms, such as passive transport, osmosis, active transport including pinocytosis and phagocytosis. Generally, R is comprised of at least one three dimensional space occupying group, that is, having a least one non-planar atom or other group with dimensions such that the total molecular volume of R in any one of its three dimensions substantially restricts its movement from the mucosal to the serosal side of the digestive tract in humans. That is, the space occupied by R is always sufficiently larger than the transport pathways of a human intestine. The pathways in farm animals including sheep, cows, steers and other farm animals are similar to humans and for those animals an operable restricting group should be larger than their pathway. This embodiment of the invention substantially prevents absorption of the active molecule into the systemic system and also eliminates the likelihood of caloric input and unwanted toxicity from any component of the compound. The restricting or controlling molecule R should have a molecular weight in excess of 400 with a presently preferred molecular weight in excess of 1000, usually in the range of 15,000 to 500,000 to substantially prevent any penetration into cells, microvilli, pores and the like. The nonnutritive antioxidant prepared according to the mode and manner of the invention having a molecular weight in excess of 1000 have essentially a zero movement rate from the mucosal to serosal side.

Exemplary materials suitable for use as the restrictor or controller molecule R include polymeric and polymeric like materials of naturally occurring and synthetic origin, and materials fabricated of the An moiety itself. When An is also R it can have a polymeric form such as its oligomer, as the dimer, trimer, tetramer, heptamer, octamer and the like. These materials comprising R can have a linear or branched structure, they can be cross-linked, and substituted or unsubstituted. The materials suitable for the present purpose are essentially indigestible for a prolonged period of time, that is, for a time sufficient to pass through the gastrointestinal tract of the user, generally about 10 hours or less to 24 hours or longer. Generically, the natural polymeric and oligomeric materials include exudates from vegetation, seed extractives, seaweed products, polymers of animal origin and the like. Generically, the synthetic polymeric and oligomeric materials include homopolymers and copolymers synthesized by condensation polymerization, addition polymerization, including free radical polymerization, and like techniques.

Exemplary of polymeric materials suitable for the present purposes include the commercially available celluloses conventionally produced by reacting cellulose with an alkali to yield an alkali cellulose, by reacting an alkali cellulose with an alkyl halide to yield a alkylcellulose, by reacting an alkali cellulose with an alkylene oxide to yield a hydroxyalkylcellulose, and the like. Typical cellulose polymers resistant to depolymerization or degradation include methylcellulose, hydroxypropyl-methylcellulose, ethylcellulose, ethylhydroxyethylcellulose, ethylmethylcellulose, hydroxyethylcellulose, hydroxyethylmethylcellulose, sodium carboxymethylcellulose, sodium carboxymethylhydroxyethylcellulose, and the like. Typical naturally occurring products include agar-agar, agarose, algin and alginates, propyleneglycol alginates, sodium alginate, Irish moss, fucoidan, acylated fucoidan, laminaian, hypnean, furcellaran, iridophycan, gum tragacanth, corn hull gum, dextran and like natural products. Exemplary synthetic polymeric materials suitable for the purpose of the present invention include carboxyvinylpolymers, poly(vinylalcohol), poly(ethyleneglycol), poly(propyleneglycol), poly(ethyleneoxide), poly(ethylenesorbitantristerate), poly(vinylpyrrolidone), polysorbate, poly(aziridine), poly(siloxane), phenolic-aldehyde polymers, phenolic-styrene polymers, poly(glycols), poly(oxides) and other polymeric materials that are metabolized only after a prolonged period of time, generally a year or more. Representative of the latter polymers include polyacrylamides, modified polyacrylamides, acrylamide-acrylic acid copolymers, cross-linked, nonbiodegradable polymeric polyacrylamides, and the like. Exemplary of $(An)_nR$ when An is R is an oligomeric material comprised of at least one An group covalently bonded to one or more like or unlike An groups to form an oligomer of the general formula $An(An)_pAn$ wherein p is 0 to 15,000 and An is any of the active groups described supra. The materials for either of the above, that is, a polymeric or oligomeric material can be used in the form of acceptable derivatives such as ethers, esters, acid addition salts, amides and the like that lend themselves to controlling the solubility of the material for enhancing the use of the compound in both the user and in commercial articles of manufacture.

The compounds of the invention $(An)_nR$ can be synthesized by conventional methods well known to the art. Generally, the group An is covalently bonded through any position or substituting group on An that does not essentially interfere with its ability to produce an antioxidant effect to a functional group on R. The conventional methods suitable for synthesizing the novel and useful compound nucleophilic substitution or displacement reactions of the following general equations of (a) $R-O^-M^+ + R'X \rightarrow R-O-R' + X^-M^+$ wherein R is a polymeric backbone, M is a cation, R' is a antioxidant moiety and X is a leaving group. Optionally, the reverse conditions wherein R is an antioxidant group and R' is a polymeric type reactant can also be used to synthesize the product. The nucleophilic substitution also includes the general equation (b),

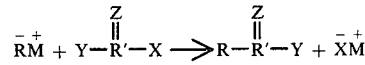

reactant, M is a cation, R' is an antioxidant group, Y is any substituent, Z is a hetero atom and X is a leaving group. As above, the nucleophilic substitution also includes the reverse conditions thereof.

The compounds of the invention can also be synthesized by nucleophilic addition or coupling reactions such as

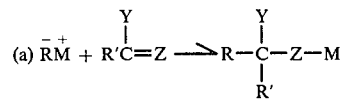

is a cation, R' is an antioxidant, Y is any substituent such as hydrogen, alkyl and the like and Z is a hetero atom such as oxygen, nitrogen or sulfur, and by the addition

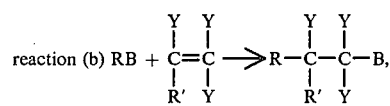

are defined except that B is a functional group containing a partial change and is optionally associated with R, and wherein optionally the reverse reaction conditions can be used to yield the product.

The product can also be synthesized by electrophilic and related addition or coupling reactions such as

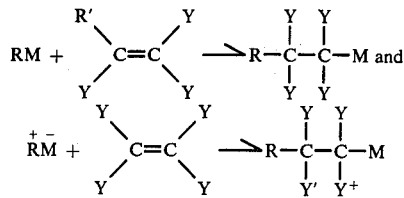

stage reaction wherein the terms are as defined and M is now an anion, and by electrophilic substitution or displacement reactions such as

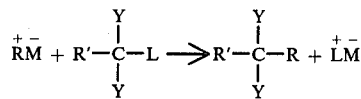

wherein the terms are as defined. These methods of synthesis are described in *Organic Chemistry* by Cram, D. J. and Hammond, G. A., Second Edition, Chapters 13, 15 and 17 through 20, 1964, published by McGraw-Hill Co., New York; *Mechanism and Structure in Organic Chemistry* by Gould, Edwin S., Chapters 4, 8 and 10 through 16, 1959, published by Holt, Rinehart and Winston, New York. Another operable method suitable for the present invention is the free radical coupling reaction. This method is comprised of irradiating a high molecular weight organic polymeric material having hydrogen atoms with ultraviolet light for a period of time sufficient to form a reactive center and simultaneously contacting the polymer with an unsaturated antioxidant compound having a relative site to form the desired product.

Typical examples for bonding the biologically active antioxidant group to the polymeric structure include reacting an antioxidant having a hydroxyl or amino group with a cyanogen halide and with a polymer having similar functional groups under mild alkaline conditions at 0° to 50° C for a time sufficient to yield the desired product. Another method is comprised of exposing a polymer to beta or gamma rays, accelerated particles or the like to form active centers such as on cellulose or the like, to which center an active antioxidant moiety becomes bonded thereto. Another representative method for forming the compound is comprised of reacting a synthetic polymer such as dextran with a halogen substituted triazinyl compound that reacts with the polymer and also has a nucleophilic substituent that can react to form a covalent bond with the antioxidant. Additionally, the antioxidant can be bonded to the polymer by conventional processes such as diazotization, by reacting an acyl halide, a carboxyl, or anhydride group of a polymer with an amino, hydroxyl or sulfhydryl group of a antioxidant in aqueous buffer media, inert organic or mixed solvents, by introducing oxirane groups into hydrophilic polymers such as the polysaccharides agarose, cellulose, sephadex, or dextran, crosslinked polyhydric alcohols, soluble and nondegradable polyacrylic acids, polyacrylamides, or their derivatives and then coupling the now activated polymers with a biologically active antioxidant having at least one reactive amino, imino, alcoholic, alkoxy, alkenyl or other functionality to produce the products of the invention wherein the antioxidant retains its original activity completely or in part.

The covalent attachment of the antioxidants to the polymer can also be effected by the reaction of an alkoxide anion, either as a functionality of the antioxidant molecule or the polymer reactant with an oxirane ring or leaving group such as a toluenesulfonate ester, which latter groups are part of the other reactant. Specifically, these methods comprise reacting the alkoxide anion functionality of the polymer with the oxirane ring or leaving group on the antioxidant molecule or conversely by reacting the alkoxide anion functionality of the antioxidant with the oxirane ring or leaving group of the polymer. The compound can also be synthesized by the combination of a 1,3-diol or with a 1,2-diol with an aldehyde, (acetalization) or ketone, (ketalization) wherein the diol function can be part of the antioxidant or polymer and the aldehyde or ketone functionality part of the alternate reactant. Other means for forming covalent bonds such as thioesters, disulfides, amides, imides, esters and the like can be readily formed, for example, by reacting a pendant carboxyl group of a sweetener with a hydroxyl, amine, mercaptan group or the like on the other reactant, wherein activation of a carboxyl group can be effected by the reaction of the carboxyl group with various carbodiimides, carbodimidazoles, Woodward's reagent and the like to form highly active intermediates capable of reacting with other groups mentioned above in the presence of a solvent and under mild reaction conditions to yield the desired compounds.

An alternative procedure for preparing $(An)_n R$ consists in using An as a monomer which can be copolymerized with a different monomer to yield a nonabsorbable copolymer in which the An moiety functions as a antioxidant agent, while remaining an integral part of the copolymer.

In another embodiment, the nonnutritive antioxidant can be synthesized as an oligomer comprised of individual An moieties covalently bonded to each other thusly $An\text{-}[An]_p\, An$ wherein $p$ is 0 to 15,000. In this embodiment at least one or all of the An moieties can produce an antioxidant effect while simultaneously remaining an integral component of the oligomer. In the above formula, An is as previously described.

Exemplary solvents, in their broadest context, are those suitable for use as a media for coupling the biologically active antioxidant group to the polymer either directly or indirectly through use of an activating agent without adversely affecting the antioxidant group or the polymer. The solvent used by those versed in the art in the light of the specification can be an inorganic, organic or mixed solvent, such as water, organic solvents in combination with water, an aqueous buffer, organic solvents such as halogenated solvents like methylene chloride, chloroform and ethylene dichloride and other solvents such as pyridine, tetrahydrofuran, dioxane, diethylether, dimethylether, benzene dimethylsulfoxide, methylene dichloride, carbon tetrachloride, cyclopentane, cyclooctane, n-hexane, n-heptane, isobutyl ketone, dimethylformamide, ether-benzene mixtures and the like. The amount of solvent used is an amount sufficient to partically or completely solvate interacted sites of the reactants and thus enhance the ability of the preselected functional group to react and produce the product.

The reaction conditions used for synthesizing the desired products and intermediate compounds used for producing the desired products are conventional reaction conditions. These reactions are usually carried out by intimately contacting and reacting the reactants optionally in the presence of a solvent for a time sufficient for them to react, usually about 15 minutes to 96 hours or longer at reaction temperatures of about 0° or less to 200° C or higher and usually at room temperature of about 25° C or at slightly elevated temperatures. Generally, stoichiometric amounts of an excess thereof of the reactants are reacted under normal atmospheric pressure or at pressures up to 10 atmospheres to produce from the starting reactants the corresponding products. The product is recovered from the reaction vessel by procedures such as the evaporation of the aqueous or organic solvents, by the addition of miscible solvents of low polarity, by chilling the mixture to precipitate the product, and the like.

Representative of acid catalysts suitable for performing the reaction when required herein are p-toluenesulfonic acid, hydrochloric acid, anhydrous hydrobromic acid, Lewis acids such as aluminum chloride, boron trifluoride, boron trichloride etherate, boron trifluoride etherate, stannic oxychloride, phosphorous oxychloride, phosphorous pentachloride, zinc chloride, zinc oxide and the like.

The ester derivative of a carboxyl group of an antioxidant group or on a polymer is obtained by standard chemical techniques that consist of reacting a carboxyl group with a solution containing a diazoalkane or the like to produce the ester. Esterification of the acid group is performed by reacting the group with a diazoalkane, for example, diazomethane, diazoethane, diazopropane, diazobutane, etc., in an inert organic solvent, for example symmetrical and unsymmetrical ethers, halogenated solvents or mixtures thereof. The esterification reaction is usually performed at a temperature of 0° to 75° C, usually at room temperature and atmospheric pressure, with the ester recovered by evaporation of the solvent and like techniques. The esterification reaction is described in *Organic Chemistry*, by Fieser and Fieser; pages 180 to 181, 1944.

The compounds of the invention bearing a basic group, such as amino or the like, can be converted to nontoxic acid addition salts having improved aqueous solubility. Although nontoxic salts are prepared, any salt may be prepared for use as an intermediate as in the preparation of another but nontoxic acid addition salt. The free basic group can be conveniently converted to the acid addition example, an alkyl, cycloalkyl, alkenyl, cycloalkenyl or aralkyl halide sulfate or sulfonate, preferable in the presence of an organic solvent inert to the reactants and reaction products. The acids which can be used to prepare the preferred nontoxic acid addition salts are those derived from mineral acids such as hydrochloric, hydrobromic, hydroiodic, nitric, sulfuric, phosphoric, acetic, citric, lactic, fumaric, tartaric, and the like. The acid addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like.

The nonnutritive antioxidant and intermediates used to prepare these when bearing a carboxyl functionality can also be used in the form of their base addition salt that have improved solubilities in water. These salts include alkali metal and alkaline earth bases such as sodium, potassium, calcium, copper and magnesium, the hydroxides and carbonates thereof, the ammonium salts and substituted ammonium salts, salts of alkyl amines such as triethylamine, trimethylamine, triisopropylamine, methylcyclohexylamine, N-(lower)alkyl piperidines and the like. Also, salts formed from compounds tetraalkylammonium hydroxides which are known as quaternary ammonium salts. The salts are prepared by procedures known to the art, for example, equivalent or stoichiometric amounts of the free carboxyl compound and the organic base are dissolved in an inert organic solvent and warming the solvent with gentle mixing of the reactants. The product or salt is then obtained by chilling the resulting mixture to precipitate the salt, powder or crystals that can be recovered by the addition of a miscible diluent of low polarity, or by the use of standard evaporation techniques. The formation of the inorganic salts is also carried out by procedures known to the art; for example, the free carboxyl group is first dissolved in a solution containing stoichiometric amounts or an excess amount of a salt forming inorganic hydroxide, carbonate or the like. The reaction is carried out in a solvent and the product obtained by procedures such as the evaporation of the solvent, by chilling to precipitate the product and like techniques.

The solubilities of the nonnutritive antioxidants, or of intermediates leading thereto, can be regulated by acylating the free hydroxyl group of the antioxidants or the polymer of both. Exemplary of acyl derivatives of the hydroxyl group are acyls having 1 to 18 carbons such as alkanoyl, alkenoyl, aroyl, and the like. Typical alkanoyl groups include formyl, valeryl, acetyl, propionyl, heptanoyl, octanoyl, undecanoyl, lauroyl, palmitoyl, stearoyl, oleoyl, isomeric forms thereof and the like; typical alkenoyl groups include acryloyl, methacryloyl, crotonyl, 3-butenyl, $\beta$-methyl-$\alpha$-butenoyl, and the like; typical aroyl groups are benzoyl, phenylacetyl, cinnamoyl, naphthoyl, p-exhoxybenzyl, allyoxyphenylacetyl, and the like. Exemplary of other acyl moieties with the scope of the invention are carboxacyl moieties such as cyclohexanecarbonyl, 3-cyclohexane-carbonyl, p-chlorophenoxyacetyl, succinyl, p-nitrobenzoyl, furoyl, 3-pyridine carbonyl, and the like.

The acylation is advantageously carried out by mixing the free hydroxyl compound with an acid anhydride usually in the presence of a tertiary amine solvent. A substantial excess of anhydride should be used, preferably about 10 moles of anhydride per mole of hydroxy compound reactant. The excess anhydride serves as a reaction diluent and solvent. The reaction is preferably carried out in the range of about 0° to 75° C, or higher, usually from 10 minutes to 36 hours. The acylated product is isolated from the reaction by conventional methods. For example, the excess anhydride can be decomposed with water, and the resulting mixture acidified and then extracted with a solvent, and the acrylate uncovered by evaporation. If desired, the acylate can be purified by conventional methods, such as chromatography.

Examples of suitable anhydrides are acetic anhydride, propionic anhydride, butyric anhydride, acrylic anhydride, crotonic anhydride, benzoic anhydride, and the like. Optionally, suitable acid halides can also be used, such as acetyl chloride, propionyl chloride, butyryl chloride, isobutyryl chloride, succinyl chloride, furoyl chloride, and the like.

The hydroxyl group attached to the nonnutritive antioxidant can be etherified to form ether derivatives that have desirable solubilities in various media. One method of preparing the ether is comprised of contacting a free hydroxyl group with an alkali hydroxide in an organic solvent to form the alkoxide. The alkoxide is then contacted with an alkyl iodide yielding the corresponding alkyl ether. Generally, the reaction is carried out at 25° to 150° C for about 15 minutes to 24 hours and optionally with a catalyst such as cuprous chloride to quicken the reaction. The ether is recovered from the reaction medium by standard techniques such as extraction, evaporation, etc. Typical of the alkyl iodides suitable for the reaction include ethyl iodide, isopropyl iodide, cyclohexylmethyl iodide, methyl iodide, 1-butyl iodide, and the like.

The following examples are set forth as representative methods illustrative of the spirit of the present invention. These examples are not to be construed as limiting the scope of the invention as other functionally equivalent means will be readily apparent to those skilled in the subject art.

EXAMPLE 1

The covalent bonding of a biologically acceptable antioxidant group to a restrictor material is illustrated by the condensation of 2 moles of 2,4-dimethylphenol (II) with one of polymethacrolein (I) in the presence of strong base, or optionally a strong acid as described in *J. Am. Chem. Soc.*, Vol. 79, pages 5019 to 5023, 1957 and trace amounts of the catalysts n-octylthiol, *Condensation Monomers*, Vol. 27, pages 595 to 598, 1972, published by John Wiley & Sons, New York. The reaction is carried out in an organic solvent pyridine or nitrobenzene followed by extraction of the unreacted phenol with aqueous base. The above reactions are depicted by the following equation.

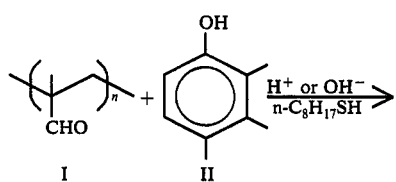

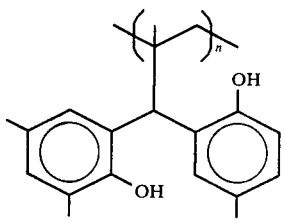

EXAMPLE 2

The covalent bonding of an antioxidant to a polymer to yield $(An)_{\overline{n}}R$ can also be carried out as follows: first, to 0.1 mole of sodium cyanoborohydride (II), J. Am. Chem. Soc. Vol. 93, pages 2897 to 2904, 1971 and 0.2 mole of ammonium chloride in 50 ml of methanol:50 ml tetrahydrofuran is added sufficient concentrated ammonium hydroxide and concentrated hydrochloric acid alternatively, to give a pH between 5 and 7 as ascertained by touching a drop of the solution to wet universal indicator paper. Next, 0.1 mole of 3,5-di-tert-butyl-4-hydroxybenzaldehyde (I) is added and the reaction stirred for about 4 hours while maintaining the pH of the reaction vessel at about pH 5 to 7. Then, the mixture is treated with 20 ml of 1 molar sodium hydroxide and extracted with 200 ml of a 10:1 volume of ethyl ether: hexane mixture to give 3,5-di-tert-butyl-4-hydroxybenzylamine (III), which is purified by silica gel column chromatography.

Next, 0.08 moles of the freshly prepared amine (III) is contacted and reacted with 0.1 mole equivalent of methyl vinyl ether maleic anhydride copolymer (IV), commercially available from GAF as Gantrez$^R$-119, reported molecular weight 25,000, in refluxing 1,2-dimethoxyethane with 0.1 ml of triethylamine for 12 hours. After cooling to room temperature, 0.2 mole of distilled acetic anhydride is added to the reaction mixture, which is reheated to refluxing temperature for 4 hours to give the corresponding polymeric amide (V). The reactions are illustrated as follows:

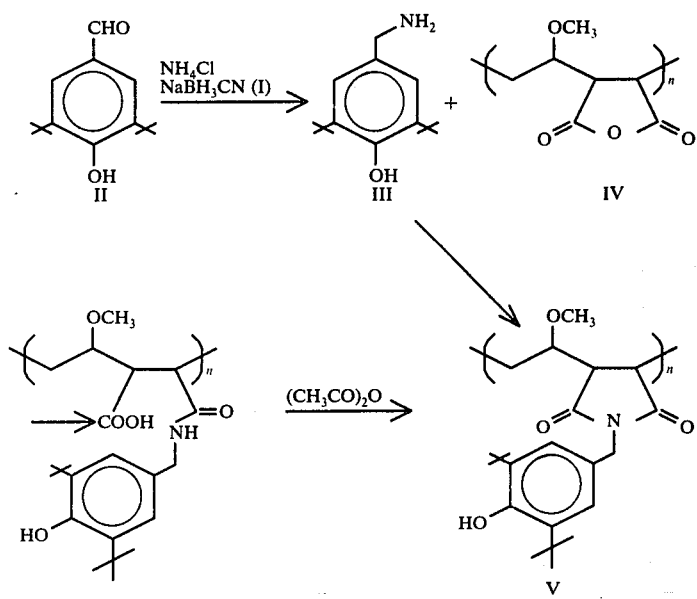

EXAMPLE 3

The reductive addition of polyvinyl alcohol (I) to the ortho or meta position of t-butylbenzoquinone (II) is carried out in the presence of the organic solvent N-methylpyrrolidone over a 24 hour period at normal atmospheric pressure. The reaction is carried out using at least a molar excess of the quinone (II) since there is also oxidation of the bound hydroquinone during the reaction. The derivatized polymer (III) is oxidized nearly quantitatively by stirring into the reaction vessel silver oxide and anhydrous magnesium sulfate to yield the corresponding reaction product (IV). An alternative procedure using palladium on carbon support and hydrogen gas at 50 psi within 12 hours to yield the corresponding reaction product (V). The reaction is as follows:

solvent dimethylsulfoxide is first degassed and then added to an inert atmospheric protected, such as nitrogen or argon, saturated mixture of 250 ml of dimethylsulfoxide, 0.3 mole of sodium hydride and 0.3 mole of 2,6-di-t-butylhydroquinone. The reaction is allowed to proceed for 24 hours to yield the polymeric hydroquinone (III) where $n$ is 10 to 100,000 or greater.

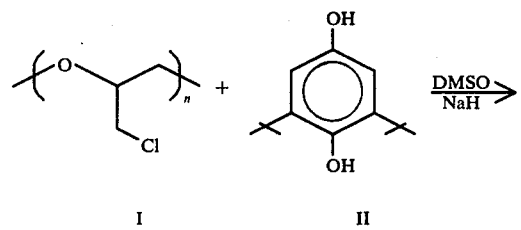

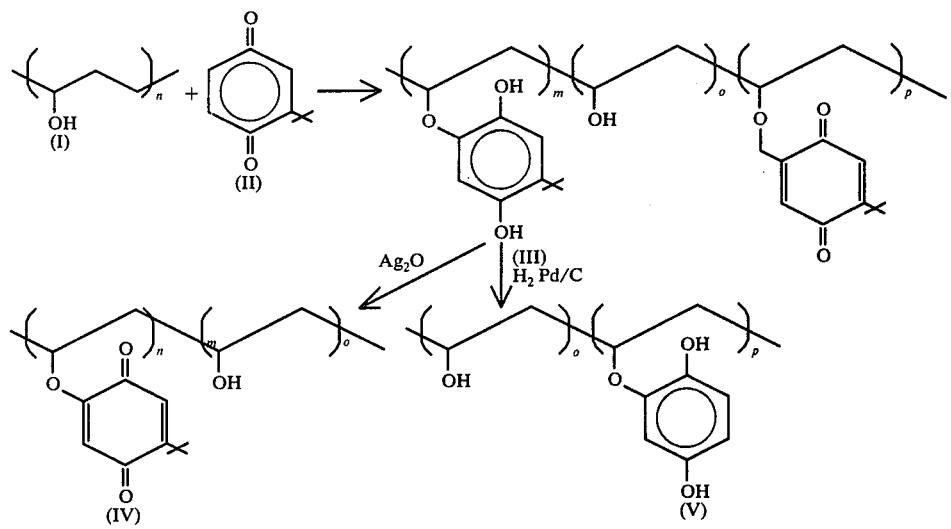

EXAMPLE 4

Preparation of a compound according to the spirit of the invention is as follows: polyepichlorohydrin (I), having a 0.3 mole chloride content, in 150 ml of the -continued

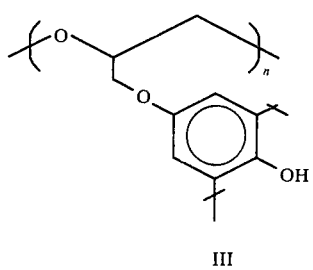

III

EXAMPLE 5

To commercially obtainable polymethylvinylsiloxane fluid

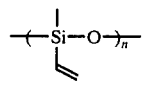

is allowed to react with less than than 0.7 mole equivalent ratio of 3-thiopropionate, as the acid or ethyl ester, and also preferrably with about 0.1 to 1 mole percent amount of chemical free radical initiator such as azoisobutylnonitrile at a temperature of 60° to 70° C for 2 hours in benzene. The corresponding polymer is obtained by lypholysis, essentially free of the reagent thiol. The reaction is schematically illustrated as follows where $n$ is in excess of 10.

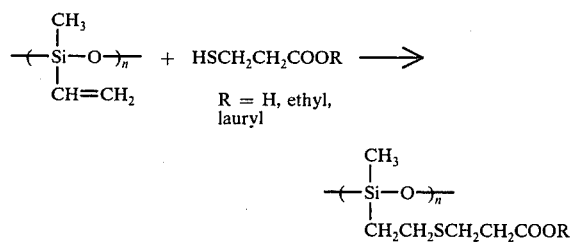

EXAMPLE 6

Repeating the procedure of Example 5, but substituting polymethylallylsiloxane for the above siloxane, and repeating all the reaction steps, yields the corresponding product, I.

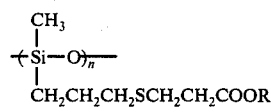 (I)

EXAMPLE 7

To an equimolar amount of chloro-2,4-dinitrobenzene acid is added sodium ethoxide in ethanol to yield 2,4-dinitrophenyl ethyl ether. Next, to a weighed aliquot of poly (glycidol) containing 0.2 mole polymer in 300 ml of ethanol is added 0.2 mole 2,4-dinitrophenyl ethyl ether, and the reactants heated to reflux and maintained at reflux reaction conditions for 1 to 2 hours. Then dry benzene is added and distillation initiated and continued until nearly all ethanol and water are azeotropically removed, to form the product identified as (I) where $n$ is greater than 10.

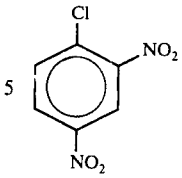 + NaOC$_2$H$_5$, C$_2$H$_5$OH ⟶

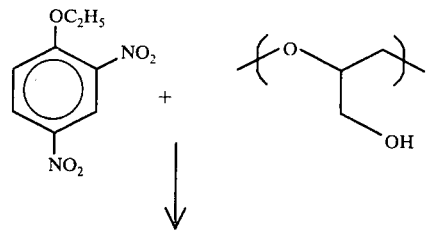

EXAMPLE 8

The covalent bonding of an arylamine to a polymer is illustrated by the reaction of 0.25 mole of commercially available poly (chloromethylstyrene) with 0.3 mole of freshly sublimed N-$\beta$-naphthyl-p-phenylene-diamine in 200 ml of benzene stirred vigorously with the addition of 50 ml of 6N alkali, sodium hydroxide and protected with an inert atmosphere of argon. The reaction can optionally be carried out in chlorinated aromatic solvents such as mono, di or trichlorobenzene.

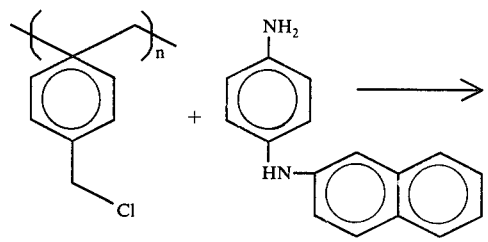

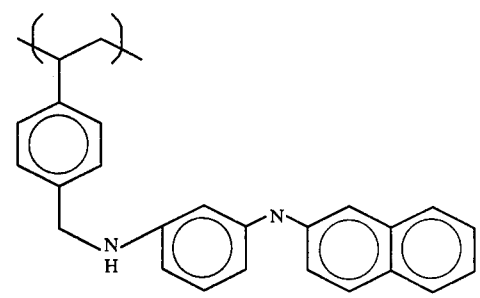

EXAMPLE 9

The bonding of o-thioaniline to form the benzthiazole with polymeric carboxylic acid is exemplified by the reaction of methyl vinyl ether acrolyl chloride copolymer. The reaction is comprised of mixing a 0.1 mole of acid chloride and 0.1 mole of o-thioaniline in 100 ml 1,2-dimethoxyethane and stirring over excess sodium hydroxide for 3 hours. The reaction yielded the amide or thio-ester which was cyclized dehydrated using diisopropylcarbodiimide and 0.1 g of triethylamine, or a benzene azeotrope and 0.3 g toluene sulfonic acid monohydrate, as illustrated below where $n$ is 10 to 500,000.

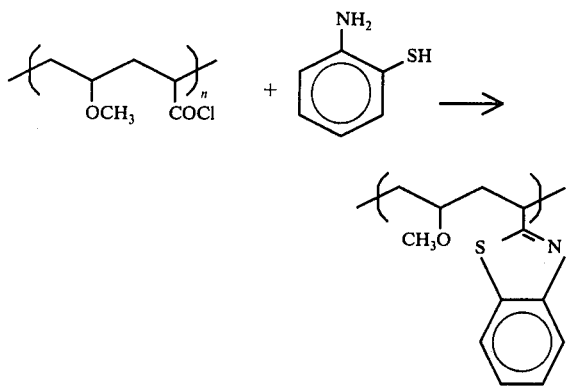

The artificial, nonnutritive, essentially nonassimable antioxidants, $(An)_nR$ of the invention are useful for stabilizing foods and the like especially against oxidation. The compounds $(An)_nR$ can act directly to prevent oxidation, and it can advantageously act against dissolved or absorbed oxygen that may form peroxides. The formation of possible peroxides also can be accelerated by moisture, heat or light that intimately contact the food. Additionally, the antioxidants can also stabilize against the production of possible decomposition products such as aldehydes, ketones and the like. The compounds of the invention can be mixed with liquids and solids, precooked and cooked substances, fresh and frozen products in an amount sufficient to give an antioxidant effect to the product. The compounds can be admixed with substances that are used orally for a short period of time such as chewing gum, toothpaste, cosmetics, mouthwash, tobacco products and the like, or they can be admixed with products that are retained for a prolonged period of time in the gastrointestinal tract.

The antioxidants of the invention also can be incorporated into any of a wide variety of foods including baked goods such as pastries, pies and the like; milk and its products such as ice cream, sherberts, custards and assorted puddings; processed canned fruits, vegetables and juices; meat products such as sweet cured bacon and ham; foods subjected to rancidity such as lard, oleo oil, butter, peanut butter, mayonnaise, cheese spreads, vegetable oils, fish oils, hydrogenated fats, milk products, egg powders, sausage, bacon, oil soluble vitamins, essential oils, margarine, lanolin, and the like. The antioxidant can also be added to confectionary products such as candies, to farm feeds such as silage, premixes, mash, pet snacks and the like. The new and useful antioxidants of the invention can also be combined with medicinals and pharmaceutical formulations including tablets, capsules, powders, lozenges, drops, elexiers, syrups, suspensions, oils, emulsions and the like.

The amount of antioxidant of the invention that can be used in not critical so long as an effective amount is used. Usually, this is an amount which provide protection comparable to other antioxidants. The amount of antioxidant $(An)_nR$ will vary for a particular food and the like and it will usually range from about 0.0001 percent to 10 percent of the total weight of the composition containing the antioxidant of the invention. Generally, for most foods, precooked, freshly cooked, frozen, and the like, for solid and liquid foods the amount added can be in levels ranging from 0.001 ppm, where ppm is parts per million, to 1,000,000 ppm or higher. Also, the antioxidant can be used alone, or in combination with any of the other antioxidants of the invention in an effective amount for substantially protecting foods and the like.

Comestible compositions of matter, that is foods, are prepared according to the mode and manner of the invention by using the nonnutritive antioxidant in edible products in conventional ways. For example, a dairy product is prepared from milk, yolk of eggs and any of the antioxidants of the invention by processing the ingredients in a usual manner in a dairy machine. Similarily, antioxidants comprised of mixtures of 2 and 3 tertiary-butyl-4-hydroxyanisole covalently bonded to the R molecule of the invention are added to gelatin desserts at a level of use of 0.0004 to 0.0002%, to potato flakes 0.005%, lard and shortening up to 0.05% and the like. Also, the novel and nonnutritive antioxidants can be used in other foods forming ingredients such as edible oils, milk solids, shortenings, cocoa, propylene glycol, bulking agents and the like, or wherever antioxidants are used.

The antioxidant of the invention $(An)_nR$ can be used with edible oils such as wheat germ oil, vegetable oil, lard oil or the like in for example a compositional mixture comprised of 1.0 to 7.0 percent of an antioxidant prepared according to the spirit of the invention, 12 to 40 percent phospholipoid such as lecithin as an additive to increase homogenicity, and 80 to 40 percent of edible oil. The antioxidant can be used alone or in mixtures thereof.

The antioxidants of the invention are distinguished from prior art antioxidants since they are not converted to carbon dioxide, water and energy by the body while retaining their antioxidant properties. Moreover, since the active antioxidant group An is essentially permanently joined through a covalent bond to a restrictor or controller that allows it to preserve valuable materials while preventing its absorption and assimilation, any adverse effects inherent in the active antioxidant group An is retained by the compound $(An)_nR$ for eventual elimination from the gastrointestinal tract by the host. And, while the above examples and disclosure are set forth merely for illustrating the mode and the manner of the invention, various modifications and embodiments can be made by those skilled in the art in the light of the invention without departing from the spirit of the invention.

What is claimed is:

1. A method of restricting the rate of oxidation of an edible material selected from among foods, beverages and pharmaceuticals which comprises adding to said edible material in an amount sufficient to restrict the rate of oxidation thereof a nonabsorbable nonnutritive antioxidant consisting essentially of a compound having a molecular weight in excess of 1000 and having the formula $(AN)_nR$ wherein An is an antioxidant capable of substantially retarding the rate of oxidation of an oxidizable material, $n$ is a number having a value of at least 1, R is a polymeric restricting means which is essentially nonmetabolizable and nonbiodegradable under the conditions of passage through the gastrointestinal tract, and ~ is a covalent bond that substantially maintains its physical and chemical integrity under the conditions of passage through the gastrointestinal tract and wherein during passage of $(An)_{\overline{n}}R$ through the gastrointestinal tract, the restricting means, R, substantially prevents passage of $(An)_{\overline{n}}R$ from the gastrointestinal lumen through the gastrointestinal mucosa into the systemic circulation.

2. A composition of matter consisting essentially of a normally oxidizable organic edible material substantially stabilized with from 0.001 percent to about 10 percent by weight of said normally oxidizable organic edible material with a nonabsorbable nonnutritive antioxidant consisting essentially of a compound having a molecular weight in excess of 1000 and having the formula $(An)_{\overline{n}}R$ wherein An is an antioxidant capable of substantially retarding the rate of oxidation of an oxidizable material, $n$ is a number having a value of at least 1, R is a polymeric restricting means which is essentially nometabolizable and nonbiodegradable under the conditions of passage through the gastrointestinal tract, and ~ is a covalent bond that substantially maintains its physical and chemical integrity under the conditions of passage through the gastrointestinal tract and wherein during passage of $(An)_{\overline{n}}R$ through the gastrointestinal tract, the restricting means, R, substantially prevents passage of $(An)_{\overline{n}}R$ from the gastrointestinal lumen through the gastrointestinal mucosa into the systemic circulation.

* * * * *